(12) United States Patent
Laselva et al.

(10) Patent No.: US 12,543,070 B2
(45) Date of Patent: Feb. 3, 2026

(54) DATA VOLUME RANGE FOR INITIATING SMALL DATA TRANSMISSION

(71) Applicant: Nokia Technologies Oy, Espoo (FI)

(72) Inventors: Daniela Laselva, Aalborg (DK); Jussi-Pekka Koskinen, Oulu (FI); Samuli Heikki Turtinen, Oulu (FI); Ahlem Khlass, Massy (FR)

(73) Assignee: Nokia Technologies Oy, Espoo (FI)

( * ) Notice: Subject to any disclaimer, the term of this patent is extended or adjusted under 35 U.S.C. 154(b) by 312 days.

(21) Appl. No.: 18/553,614

(22) PCT Filed: Mar. 11, 2022

(86) PCT No.: PCT/EP2022/056371
§ 371 (c)(1),
(2) Date: Oct. 2, 2023

(87) PCT Pub. No.: WO2022/207279
PCT Pub. Date: Oct. 6, 2022

(65) Prior Publication Data
US 2024/0187927 A1  Jun. 6, 2024

(30) Foreign Application Priority Data

Apr. 1, 2021 (FI) ..................................... 20215405

(51) Int. Cl.
*H04W 28/06* (2009.01)
*H04W 28/02* (2009.01)
(Continued)

(52) U.S. Cl.
CPC ....... *H04W 28/06* (2013.01); *H04W 28/0278* (2013.01); *H04W 74/0833* (2013.01); *H04W 74/0836* (2024.01)

(58) Field of Classification Search
CPC . H04W 28/0278; H04W 28/06; H04W 76/27; H04W 74/0833; H04W 74/0836; H04L 51/58
See application file for complete search history.

(56) References Cited

U.S. PATENT DOCUMENTS

2021/0203449 A1* 7/2021 Chatterjee ............. H04L 1/1896
2021/0315049 A1* 10/2021 Wei ....................... H04W 76/27
(Continued)

*Primary Examiner* — Syed Ali
(74) *Attorney, Agent, or Firm* — Barta Jones, PLLC (57) ABSTRACT

There are provided apparatuses, methods and computer program products. In accordance with an embodiment, there is disclosed a method comprising defining at least one message length related criterium comprising at least a minimum data volume threshold; determining whether transmission of a message using a small data transmission procedure in an inactive state of the user equipment is allowed; and providing the user equipment indication of the usage of the at least one message length related criterium. There is also disclosed a method comprising obtaining at least one message length related criterium comprising at least a minimum data volume threshold; preparing at least one message to a message buffer of the user equipment to be transmitted by a small data transmission procedure in an inactive state of the user equipment; comparing a length of data in the message buffer with the at least one message length related criterium; n constructing a packet from the data in the message buffer for transmission; and transmitting the packet by the small data transmission procedure if the length fulfils the at least one message length related criterium.

20 Claims, 5 Drawing Sheets

(51) Int. Cl.
  *H04W 74/0833*  (2024.01)
  *H04W 74/0836*  (2024.01)

(56) References Cited

U.S. PATENT DOCUMENTS

2021/0410180 A1* 12/2021 Tsai ...................... H04L 1/1819
2024/0023070 A1*  1/2024 You ...................... H04W 76/27
2024/0040626 A1*  2/2024 Tseng .................. H04W 72/542
2024/0147348 A1*  5/2024 Kaikkonen ........... H04W 76/20

* cited by examiner

DATA VOLUME RANGE FOR INITIATING SMALL DATA TRANSMISSION

RELATED APPLICATION

This application was originally filed as PCT Application No. PCT/EP2022/056371, filed on Mar. 11, 2022, which claims priority from FI Application No. 20215405, filed on Apr. 1, 2021, each of which is incorporated herein by reference in its entirety.

TECHNICAL FIELD

The present invention relates to a method and apparatus for controlling transmission of small amount of data from a user equipment to a wireless network when the user equipment is in an inactive state.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR ($5^{th}$ generation New Radio) is a new radio access technology which has been developed by the $3^{rd}$ generation partnership project (3GPP) for the $5^{th}$ generation mobile networks. 5G-NR has been specified within 3GPP to be able to coexist with 4G-LTE (Long Term Evolution) within the same spectrum. In 5G systems a mobile communication device, which may also be called as a user equipment (UE), may be in different states depending whether it is connected with the network or not. For example, when the mobile communication device does not have an active data communication connection, the mobile communication device may be in a so-called inactive state or in an idle state. If the mobile communication device had a message to be transmitted when the mobile communication device is in the inactive state, the mobile communication device should typically change the state to connected and only after that may be able to transmit the message or messages.

Messages to be transmitted may not always contain a large payload but may only have a relatively small payload. Therefore, the network may be able to allow transmission of messages having relatively small payload while the mobile communication device is in the inactive state such as an RRC_INACTIVE state of the 5G-NR. This may avoid a connection setup and subsequently release to the inactive state procedures to happen for each small data transmission (SDT). Furthermore, power consumption and signalling overhead may be reduced. This kind of small data transmission procedure may also be called as an SDT procedure for short. This kind of transmission is also called as inactive state message transmission in this specification.

Such small data transmission may be beneficial for a variety of applications and services whose data payload is rather small. However, it may not be efficient for the network if a UE would initiate an SDT procedure anytime its buffer is filled with such a small payload. Every SDT procedure comes at a certain radio resource cost for the network, in terms of physical random access channel (PRACH) preambles, if random access small data transmission (RA-SDT) is used, and physical uplink shared channel (PUSCH) resources in order to carry the small payload itself plus its encapsulation overhead (e.g. PHY/MAC/RLC/PDCP headers according to the 5G NR protocol stack) as well as the RRC Resume Request message (48 or 64 bits).

Therefore, a mechanism to somehow prohibit transmission of messages having relatively small payload in the inactive state from time to time might address the above mentioned drawback.

SUMMARY

Some embodiments provide a method, apparatus, and computer program product for controlling transmission of small amount of data from a user equipment to a wireless network when the user equipment is in an inactive state without changing the state of the user equipment from inactive state to connected state.

Some embodiments are implemented in the context of the 5G communication systems and relate to a network implementation of mechanisms for controlling under which conditions small data transmission mechanism is allowed or prohibited. In particular, some embodiments provide a data volume limit, comprising at least a minimum data volume threshold and possibly also a maximum data volume threshold, to determine whether to initiate the small data transmission (SDT) in RRC Inactive state. Hence, in accordance with an embodiment of the disclosure, the UE is allowed to use SDT only if its data volume is within the configured data volume range, whereas if its data volume is not inside the range, it should either wait and collect more data or use a regular connection resume. Whenever the data delay bound is relaxed, this may avoid frequent SDT procedures each carrying very limited data amount and, in turn, may reduce the SDT costs (e.g. radio resources consumption).

In accordance with an embodiment, the network decides and controls the data volume range for SDT and indicates this to the user equipment either via dedicated signalling or via broadcast. Following information, among other things, may be indicated to the user equipment:
the minimum data volume threshold;
the maximum data volume threshold.

According to some aspects, there is provided the subject matter of the independent claims. Some further aspects are defined in the dependent claims. The embodiments that do not fall under the scope of the claims are to be interpreted as examples useful for understanding the disclosure.

According to a first aspect there is provided a user equipment comprising means for:
 obtaining at least one message length related criterium comprising at least a minimum data volume threshold;
 preparing at least one message to a message buffer of the user equipment to be transmitted by a small data transmission procedure in an inactive state of the user equipment;
 comparing a length of data in the message buffer with the at least one message length related criterium;
 based on the comparison constructing a packet from the data in the message buffer for transmission; and
 transmitting the packet by the small data transmission procedure if the length fulfils the at least one message length related criterium.

According to a second aspect there is provided a method comprising:
 obtaining at least one message length related criterium comprising at least a minimum data volume threshold;

preparing at least one message to a message buffer of the user equipment to be transmitted by a small data transmission procedure in an inactive state of the user equipment;

comparing a length of data in the message buffer with the at least one message length related criterium;

based on the comparison constructing a packet from the data in the message buffer for transmission; and transmitting the packet by the small data transmission procedure if the length fulfils the at least one message length related criterium.

According to a third aspect there is provided an apparatus comprising at least one processor; and at least one memory including computer program code the at least one memory and the computer program code configured to, with the at least one processor, cause the apparatus to perform at least the following:

obtain at least one message length related criterium comprising at least a minimum data volume threshold;

prepare at least one message to a message buffer of the user equipment to be transmitted by a small data transmission procedure in an inactive state of the apparatus;

compare a length of data in the message buffer with the at least one message length related criterium;

based on the comparison construct a packet from the data in the message buffer for transmission; and transmit the packet by the small data transmission procedure if the length fulfils the at least one message length related criterium.

According to a fourth aspect there is provided a computer program comprising computer readable program code which, when executed by at least one processor; cause the apparatus or system to perform at least the following:

obtain at least one message length related criterium comprising at least a minimum data volume threshold;

prepare at least one message to a message buffer of the user equipment to be transmitted by a small data transmission procedure in an inactive state of the apparatus or system;

compare a length of data in the message buffer with the at least one message length related criterium;

based on the comparison construct a packet from the data in the message buffer for transmission; and transmit the packet by the small data transmission procedure if the length fulfils the at least one message length related criterium.

According to a fifth aspect there is provided a network element comprising means for:

defining at least one message length related criterium comprising at least a minimum data volume threshold;

determining whether transmission of a message using a small data transmission procedure in an inactive state of the user equipment is allowed; and providing the user equipment indication of the usage of the at least one message length related criterium.

According to a sixth aspect there is provided a method comprising:

defining at least one message length related criterium comprising at least a minimum data volume threshold;

determining whether transmission of a message using a small data transmission procedure in an inactive state of the user equipment is allowed; and providing the user equipment indication of the usage of the at least one message length related criterium.

According to a seventh aspect there is provided an apparatus comprising at least one processor; and at least one memory including computer program code the at least one memory and the computer program code configured to, with the at least one processor, cause the apparatus to perform at least the following:

define at least one message length related criterium comprising at least a minimum data volume threshold;

determine whether transmission of a message using a small data transmission procedure in an inactive state of the user equipment is allowed; and provide the user equipment indication of the usage of the at least one message length related criterium.

According to an eighth aspect there is provided a computer program comprising computer readable program code which, when executed by at least one processor; cause the apparatus to perform at least the following:

define at least one message length related criterium comprising at least a minimum data volume threshold;

determine whether transmission of a message using a small data transmission procedure in an inactive state of the user equipment is allowed; and provide the user equipment indication of the usage of the at least one message length related criterium.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

It should be noted here that in this specification, the term 'base station' refers to a logical element containing logical communication system layers (e.g. L1, L2, L3). The base stations of different RATs may be implemented in the same hardware or at separate hardware. It should also be mentioned that although the expressions "each base station" and "each mobile station" or "each user equipment" may be used, these terms need not mean every existing base station, mobile station or user equipment but base stations, mobile stations or user equipment in a certain area or set. For example, each base station may mean all base stations within a certain geographical area or all base stations of an operator of a wireless communication network or a sub-set of base stations of an operator of a wireless communication network.

Figure 1:
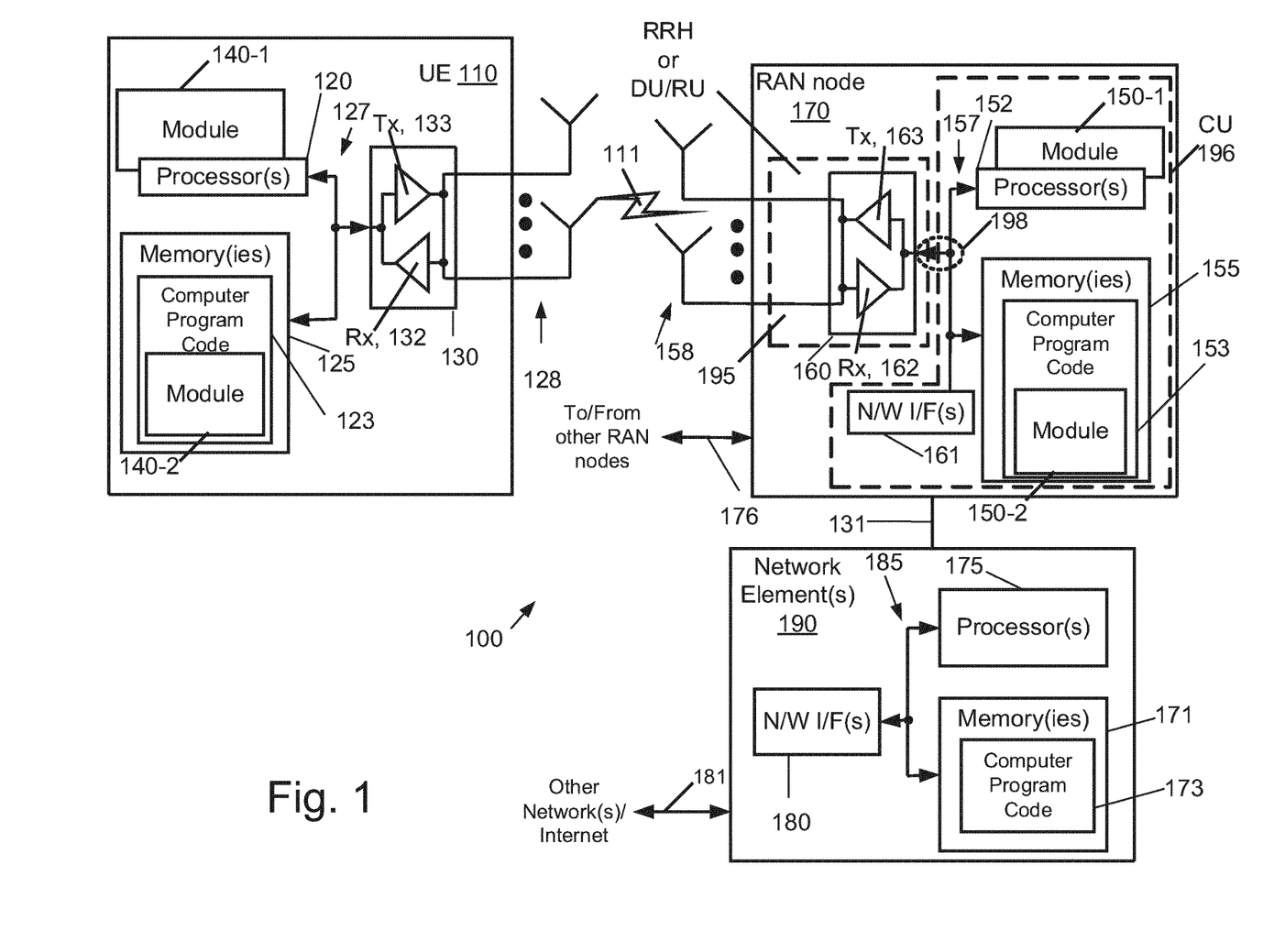
FIG. 1 shows a block diagram of one possible and non-limiting example in which the examples may be practiced.

FIG. 1 shows a block diagram of one possible and non-limiting example in which the examples may be practiced. A user equipment (UE) 110, radio access network (RAN) node 170, and network element(s) 190 are illustrated. In the example of FIG. 1, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE and connected via the NG interface to a 5GC (such as, for example, the network element(s) 190). The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may also be implemented as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

When the user equipment 110 is in the inactive state (RRC_INACTIVE), data transmission from the user equipment 110 to the cell may or may not be prevented. Hence, if the transmission from the user equipment 110 to the cell in the inactive state is prevented, the user equipment 110 should resume the connection i.e. to change the state of the user equipment 110 to the connected state (RRC_CONNECTED) to be able to receive data from the network (mobile terminated MT, downlink DL) and transmit data to the network (mobile originated MO, uplink UL). Thus, connection resume and subsequently release to the inactive state typically happens for each data transmission irrespective of how small and infrequent the data packets are. This results in unnecessary power consumption and signalling overhead.

So called "Signalling Radio Bearers" (SRBs) are defined for NR as Radio Bearers (RBs) which can be used for transmission of certain types of messages such as RRC or NAS (non-access stratum) messages. In accordance with an example, the following signalling radio bearers are defined:

- SRB0 is for RRC messages using a common control channel (CCCH logical channel);
- SRB1 is for RRC messages, which may include a piggybacked NAS message, as well as for NAS messages prior to the establishment of SRB2, all using a dedicated control channel (DCCH logical channel);
- SRB2 is for NAS messages, all using DCCH logical channel. SRB2 has a lower priority than SRB1 and may be configured by the network after AS security activation;
- SRB3 is for specific RRC messages when UE is in NG-RAN E-UTRA-NR dual connectivity ((NG)EN-DC) or in NR-NR dual connectivity (NR-DC), all using DCCH logical channel.

So called "Data Radio Bearers" (DRBs) are used to carry User-Plane traffic (user data) such as IP (Internet Protocol) packets between the user equipment and the RAN node, for example.

Figure 2A:
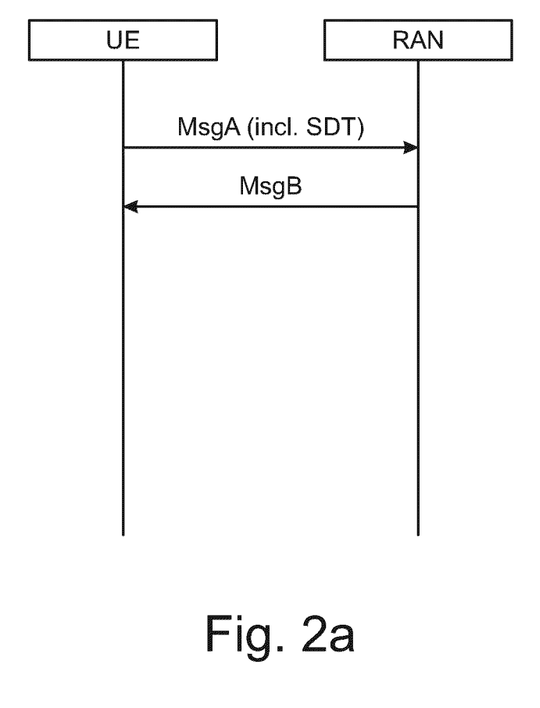
FIG. 2a shows an example of transmission of the small data utilizing a 2-step RACH transmission.

In accordance with an approach, transmission of the small data is performed utilizing the so-called 2-step RA (Random Access) procedure via RACH transmission i.e. one (a first) message (MSGA) from the user equipment to the network, and a second (a reply) message (MSGB) from the network to the user equipment. In this case at least part of the small data may be inserted in the first message from the user equipment to the network as is illustrated in the signalling diagram of FIG. 2a.

Figure 2B:
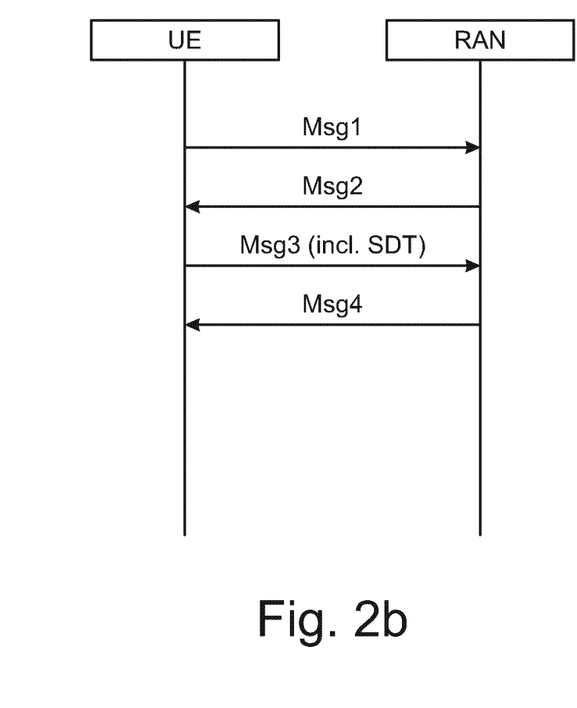
FIG. 2b shows an example of transmission of the small data utilizing a 4-step RACH transmission.

In accordance with another approach, transmission of the small data is performed utilizing the so-called 4-step RA procedure via RACH transmission (RA based SDT, RA-SDT) i.e. two messages (a first and a third) message (MSG1, MSG3) from the user equipment to the network, and two messages (a second and a fourth) message (MSG2, MSG4) from the network to the user equipment. In this case at least part of the small data may be inserted in the third message, as is illustrated in the signalling diagram of FIG. 2b.

In accordance with yet another approach, transmission of the small data is performed utilizing a configured grant (CG based SDT, CG-SDT). In this case the small data is transmitted in a configured grant resource.

Control Plane data (e.g. the RRC messages or some of them) could also be restricted to use a specific small data transmission mechanism which could also be configured RRC message or SRB specifically.

In accordance with an approach, a user equipment could always apply default configurations specified for the SRBs when used for small data transmission.

In the following some specific examples of small and infrequent data traffic are shortly described. Smartphone applications include traffic transmitted from instant messaging services (e.g. whatsapp, QQ, wechat etc.), heart-beat/keep-alive traffic from instant messaging and/or email clients and other applications, push notifications from various applications, etc. Non-smartphone applications include traffic from wearables (e.g. periodic positioning information etc.), sensors (Industrial Wireless Sensor Networks transmitting temperature, pressure readings periodically or in an event triggered manner etc.), smart meters and smart meter networks sending periodic meter readings, etc.

Signalling overhead from the inactive state user equipments for small data packets may be a general problem and may become a critical issue with increasing number of user equipments operating in the NR, not only for network performance and efficiency but also for the user equipment battery performance. In general, any device that has intermittent small data packets in the inactive state may benefit from enabling small data transmission in the inactive state.

It may be the user equipment which decides whether to utilize SDT or not based on a data volume threshold. For example, the user equipment may examine the amount of data to be transmitted and on the basis of the examination decides whether to initiate SDT or to transition to the connected state for data transmission.

The user equipment may be able to use configured grant based small data transmission (CG-SDT) if at least the following criteria is fulfilled (1) the amount of user data is less than or equal to a maximum data volume threshold; (2) configured grant resource is configured and valid; (3) user equipment has valid timing advanced (TA) information.

The minimum data volume threshold and the maximum data volume threshold may also be called as message length related thresholds in this specification.

In accordance with some embodiments, the network decides if transmission of small data from the user equipment is allowed in the inactive state and if so, what kind of messages are allowed. Further, the network may also decide e.g. the maximum length for the small data messages and/or how often the user equipment is allowed to initiate and/or use the small data transmission procedure (e.g. CG-SDT or RA-SDT or both). These decisions may be made by a network operator who enters those small data transmission related parameters to the wireless communication network, or they may be determined by the manufacturer of elements of the wireless communication network and/or by some other entity.

In other words, the network controls which RRC messages are allowed to use the small data transmission mechanism/procedure SDT, how often they may be used by a user equipment, in what conditions they may be used or may not be used, etc. The network indicates the RRC messages that are allowed to use SDT, including whether the RRC messages are sent using a special RRC container or the existing messages. This could also include using a different signalling radio bearer than normally. For example, a signalling radio bearer 2 (SRB2) could be used for a message, or the data could be included in a container whose type is indicated via the message.

On the other hand, if transmission of small data from the user equipment is not allowed in the inactive state, the network may provide any indication that transmission of small data from the user equipment is not allowed in the inactive state.

In the following some embodiments are described how transmission of relatively short (small) messages may be restricted or prohibited based on the amount of data to be transmitted and how the restrictions and/or prohibitions may be indicated to the user equipment. In the following other criteria regarding allowance of the usage of SDT or not may not be discussed in more detail although they also may affect whether the UE may utilize the SDT or not.

In accordance with an embodiment, the network configures a prohibit mechanism which utilizes one or more control elements for determination by a user equipment whether initiation of and utilization of a small data transmission mechanism is prohibited or not when the user equipment is in an inactive state. For example, the network may define at least a minimum data volume threshold 126 and also a maximum data volume threshold 129, a timer for indicating the user equipment a period when the user equipment is prohibited to transmit data by the SDT procedure. Such a prohibit timer or timers 122 (FIG. 5) may be specified for different SDT procedures or may be a general timer applicable for each available SDT procedure. As an example, if the configured grant based SDT is applicable in the network, the network may configure a CG-SDT specific prohibit timer. As another example, if the RA based SDT is applicable in the network, the network may configure an RA-SDT specific prohibit timer. If both the configured grant based SDT and the RA based SDT is applicable in the network, the network may configure separately the CG-SDT specific prohibit timer and the RA-SDT specific prohibit timer, or the network may configure a common SDT prohibit timer for both SDT procedures.

Figure 5:
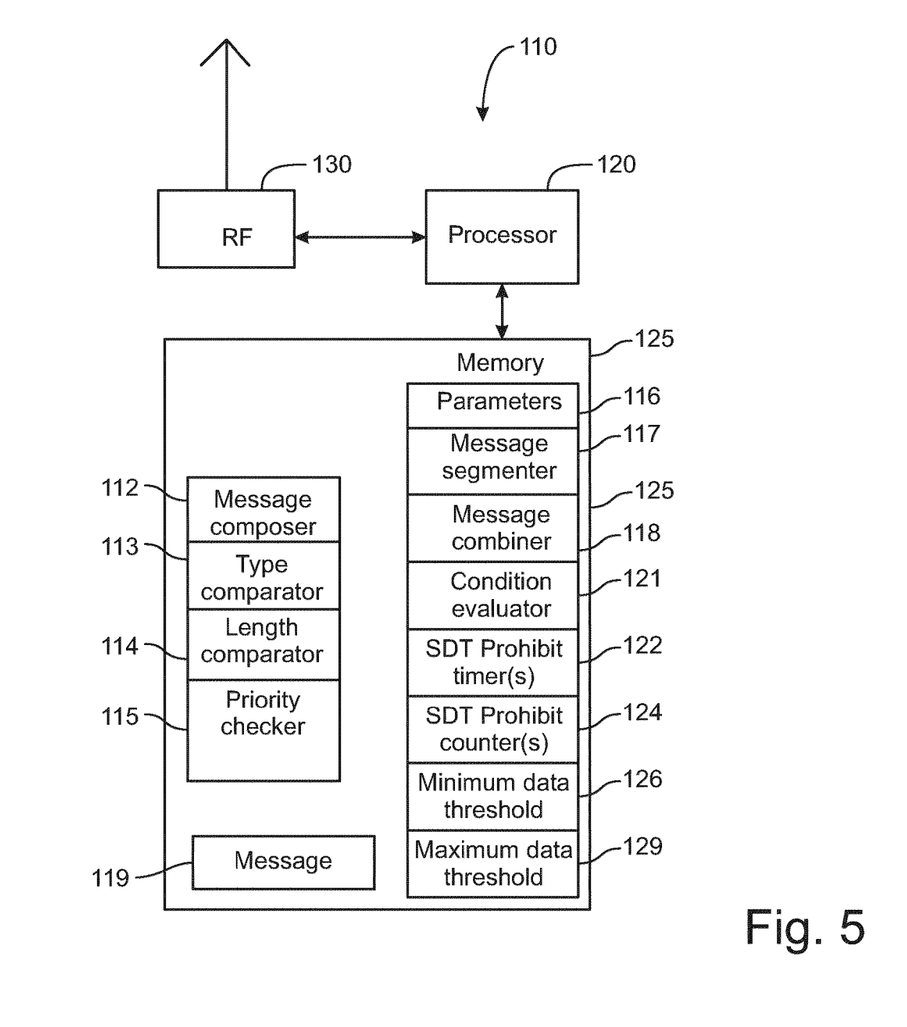
FIG. 5 shows a block diagram of an apparatus in accordance with at least some embodiments.

In accordance with an embodiment of the disclosure, the minimum data volume threshold 126 may be defined to be equal to a minimum transport block size defined for the SDT, such as 328 bits. The maximum data volume threshold 129 may be defined to be equal to a maximum data amount for using SDT, such as 1000 bits.

In accordance with an embodiment, the RAN node 170 forms a configuration message in which small message transmission related parameters are transmitted to one or more user equipment. For example, the configuration message may be a RRCRelease with suspend indication (also referred to as suspend configuration) message which the RAN node 170 may use to push a certain user equipment to the inactive state. This kind of message may be thought as a message dedicated to a certain receiver. As another example, the configuration message may be a broadcast message such as a cell select info message which don't have a dedicated receiver but all user equipment within the serving area of the RAN node 170 may be able to receive and interpret the message. Also other messages may be used for transmitting the parameters to the user equipment. Hence, the network may send information of the SDT prohibit timer or SDT prohibit timers to the user equipment using the same configuration message(s) which is/are used for informing the other SDT related parameters, which may be stored e.g. to a parameter memory 116 in the user equipment.

Figure 3:
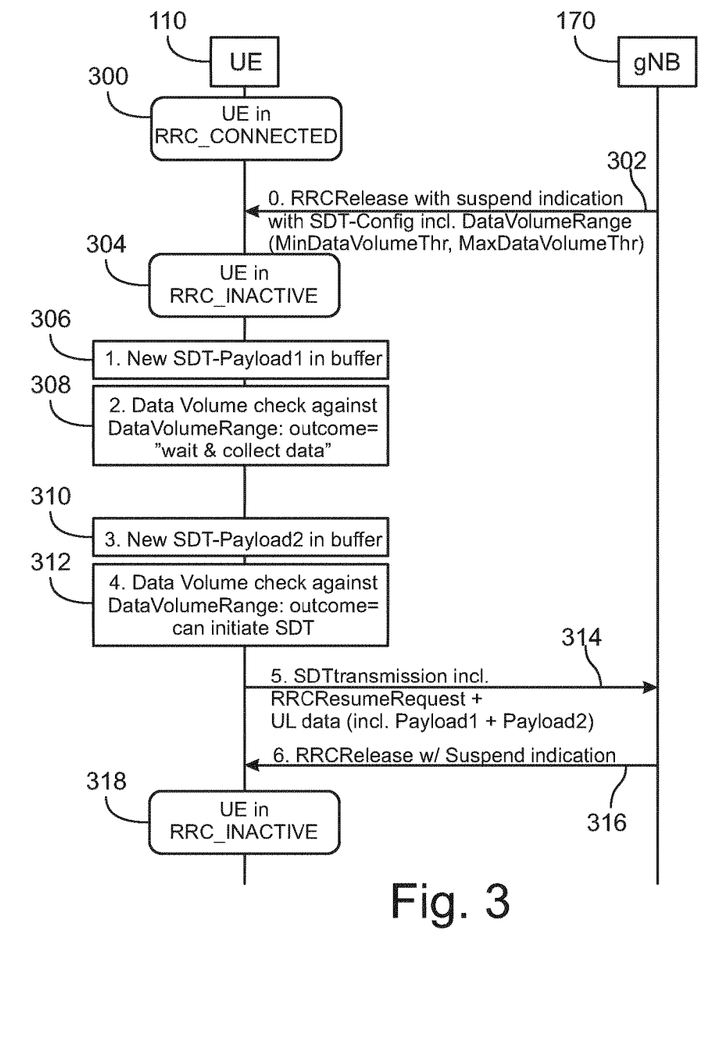
FIG. 3 shows an exemplary flow chart illustrating some actions by a user equipment and a network element when the user equipment aims to transmit small data amounts, in accordance with an embodiment of the disclosure.

FIG. 3 is a flow diagram which illustrates some actions by a user equipment and a network element when the user equipment aims to transmit small data amounts, in accordance with an embodiment of the disclosure.

The user equipment 110 may be set to a connected state such as RRC_CONNECTED to be able to receive some configuration parameters from the network element 170 (block 300 in FIG. 3). The network element 170 transmits 302 a message which sets the user equipment to the inactive state and may comprise small data transmission configuration parameters including at least the minimum data volume threshold 126 (MinDataVolumeThr) and the maximum data volume threshold 129 (MaxDataVolumeThr). Such message may be, for example, a RRCRelease with suspend indication message with SDT-Config incl. DataVolumeRange, MaxDataVolumeThr. The user equipment receives the message and changes the state to the inactive state RRC_INACTIVE (304).

The user equipment 110 may also receive indication of causes which are allowed to be transmitted by utilizing the small data transmission mechanism and some other information regarding the SDT mechanism such as the SDT timer, an SDT counter 124, and/or some other information. The indication may have been transmitted by a network element (e.g. the RAN node 170) as a broadcast message or in a dedicated message to the user equipment 110. Such indication may have been transmitted well before the user equipment 110 has a small message to be transmitted, wherein the user equipment has stored the corresponding information in a memory for later use.

When there is a new message (306) in a message buffer 119 of the user equipment 110 which could be transmitted by the small data transmission mechanism, the user equipment 110, e.g. the length comparator 114 of the user equipment 110, compares 308 the length of data to be transmitted currently in the message buffer 119 with the minimum data volume threshold and if the length is less than the minimum data volume threshold, the outcome of the comparison may be "wait collect more data".

If another message arrives (310) to the message buffer 119 of the user equipment 110, the length comparator 114 of the user equipment 110 compares 312 the length of data currently in the message buffer 119 with the minimum data volume threshold. In this example situation the length is now the total length of the first message and the second message. It is now assumed that the length of data in the message buffer 119 is not less than the minimum data volume threshold, wherein the length comparator 114 may further compare the length of data currently in the message buffer 119 with the maximum data volume threshold and if the length of data in the message buffer 119 is not more than the maximum data volume threshold, the outcome of the comparison may be "can initiate SDT". Hence, the user equipment 110 may construct a packet, such as a MAC PDU, from the data in the message buffer based e.g. on a transport block size configured for SDT for transmission. The user equipment 110 then transmits 314 the packet by the SDT procedure. The transmission may comprise transmission of RRCResumeRequest+UL data (incl. Payload1+Payload2). The network element may response by sending 316 a message to acknowledge the reception of the message(s) and to maintain 318 the user equipment in the inactive state. In accordance with an approach the message is an RRCRrelease message with a suspend indication.

In accordance with an approach, before checking the length of the message(s) (payload(s)) in the message buffer 119 and/or before beginning the short message transmission, there may also be other conditions to be checked than the length of payload(s) before the SDT procedure can be performed. For example, a condition evaluator 121 of the user equipment may examine whether transmission of the small data is not prohibited at the moment. In accordance with an approach, the condition evaluator 121 examines a status of a prohibit timer or prohibit timers 122. If any of the prohibit timers is running, that particular SDT procedure is not applicable. For example, if the network has configured the CG-SDT specific prohibit timer and the RA-SDT specific prohibit timer and the CG-SDT specific prohibit timer is running and the RA-SDT specific prohibit timer is not running, the condition evaluator 121 may deduce that at least the CG-SDT procedure is not allowed at the moment. Therefore, the user equipment may decide to use the RA-SDT procedure or postpone the transmission of the small message.

In accordance with one example where the user equipment postpones the transmission of the small message the condition evaluator 121 may examine at intervals whether the prohibit timer is running or has expired (has stopped running). When the prohibit timer expires the condition evaluator may cause the user equipment to initiate CG-SDT or RA-SDT procedure.

In accordance with one example where prohibit timer is stopped or expires, an access stratum layer (AS) of a wireless telecom protocol stack of the user equipment informs a non-access stratum layer (NAS) of the wireless telecom protocol stack that SDT is allowed, wherein the user equipment may begin initiation of the small data transmission.

According to some embodiments of the disclosure, the network may also configure the conditions when the prohibit timer should be (re-)started by the user equipment. For example, the network may inform the user equipment that example the prohibit timer shall be started by the user equipment upon transmitting SDT data or when receiving an RRC Release with suspend indication message which terminates the SDT procedure.

Furthermore, the network may also configure the conditions when the prohibit timer should be stopped by the user equipment. In one example the prohibit timer is stopped when certain amount of time elapses, cell (re)selection occurs, or when RRC Connection is established/resumed.

In one example the network indicates the user equipment to (re-)start SDT prohibit timer e.g. in RRC signalling (e.g. RRC Release) or MAC signalling (MAC CE).

The expression the prohibit timer is running means that the timer is performing some kind of measurement of time.

The expression the prohibit timer has stopped means that the prohibit timer is no longer measuring time. A reason for the stoppage may be that a certain condition has occurred, a certain time has lapsed since the beginning of the time measurement, etc. The expression the prohibit timer has expired means also that the prohibit timer is no longer measuring time because it has reached a certain upper limit (or lower limit if the prohibit timer is counting down).

In the following, some further embodiments of the present disclosure utilizing the data volume range are described in more detail.

In accordance with an embodiment of the present disclosure, the network element 170 may configure a plurality of data volume ranges for different purposes. For example, the data volume range may be defined for each data radio bearer DRB and/or for each signalling radio bearer SRB configured with SDT, i.e. a DataVolumeRange for one or more DRB/SRB allowed for SDT. Hence, the user equipment 110 may apply the data volume range corresponding to the data radio bearer DRB or the signalling radio bearer SRB to which the data in its message buffer 119 belongs to. In one example, if data from different SDT-DRBs/SRBs is present in the message buffer 119, the user equipment 110 may apply the larger data volume range among the ranges associated to the data radio bearers and/or the signalling radio bearers for which it has data. In one example, the user equipment 110 can be configured with a data volume range per data radio bearer/signalling radio bearer as well as an aggregate range among the data radio bearers and/or the signalling radio bearers. In other words, if data is available only for a given data radio bearer/signalling radio bearer, the radio bearer specific range applies; however, in case data is available for multiple bearers, either the radio bearer specific or the aggregate range can be applied to initiate SDT. In one example, the network element 170 can configure the data radio bearers and/or the signalling radio bearers without the data volume range, or alternatively, a minimum data volume threshold value of zero is defined. In another example, the data volume range for the data radio bearer and/or the signalling radio bearer can be set by the network accounting for the data delay target (e.g. Packet Delay Budget, PDB).

In accordance with another embodiment of the present disclosure, the network element 170 can associate a data volume range or at least the minimum data volume threshold 126 to an SDT resource (incl. CG-SDT, 2-step RA-SDT, or 4-step RA SDT resources) to influence the SDT resource selection for an SDT type. For example, the CG-SDT configuration can include CG-Config #1 and CG-Config #2 (differing for e.g. their transmission block TB size, cell group CG resource periodicity, etc), which are associated with a first minimum data volume threshold MinThr #1 and a second minimum data volume threshold MinThr #2, respectively. For example, if the first minimum data volume threshold is smaller than the second minimum data volume threshold, the corresponding behaviour of the user equipment 110 may be as follows if other validity conditions regarding CG-SDT selection are also met:

If the length of the data is less than the first minimum data volume threshold MinThr #1 then the user equipment 110 waits and collects more data. On the other hand, if the length of the data is not less than the first minimum data volume threshold MinThr #1 but is less than the second minimum data volume threshold MinThr #2, the user equipment 110 selects a CG resource of CG-Config #1. If the length of the data is not less than the first minimum data volume threshold MinThr #1 and is not less than the second minimum data volume threshold MinThr #2, the user equipment 110 selects a CG resource of CG-Config #2.

In accordance with another embodiment of the present disclosure, the network element 170 can configure a user equipment 110 so that there is a data volume range definition for each SDT type such as CG-SDT, 2-step RA-SDT and 4-step RA SDT which in one example influences the SDT type selection e.g. as follows. It is assumed that there is a first data volume range definition for CG-SDT comprising at least a first minimum data volume threshold MinThr_CG-SDT, a second data volume range definition for 2-step RA-SDT comprising at least a second minimum data volume threshold MinThr_2stepRA-SDT, and a third data volume range definition for 4-step RA SDT comprising at least a third minimum data volume threshold MinThr_4stepRA-SDT. It is also assumed that the first minimum data volume threshold MinThr_CG-SDT is smaller than the second minimum data volume threshold MinThr_2stepRA-SDT. If a situation occurs in which the volume of the data is less than the first minimum data volume threshold MinThr_CG-SDT then the user equipment waits and collects more data. On the other hand, if the volume of the data is not less than the first minimum data volume threshold MinThr_CG-SDT but is less than the second minimum data volume threshold MinThr_2stepRA-SDT, then the user equipment 110 selects the CG-SDT method. If the volume of the data is not less than the first minimum data volume threshold MinThr_CG-SDT and is not less than the second minimum data volume threshold MinThr_2stepRA-SDT, then the user equipment 110 selects the RA-SDT method. It should be noted here that the above procedure assumes that other possible validity conditions are also met.

In accordance with an embodiment of the disclosure, the network element 170 can configure and/or reconfigure the data volume range and/or the minimum data volume threshold 126 based on network load among other input parameters. For example, a higher value can be (re)configured if the load is high or is increasing and vice-versa.

In accordance with an embodiment of the disclosure, the user equipment 110 can be additionally configured with a timer 122 which controls when the user equipment 110 can initiate SDT even though it has less amount of data for SDT than the minimum data volume threshold 126. In other words, when amount of SDT data less than the minimum data volume threshold 126 becomes available into the message buffer 119 of the user equipment 110, the user equipment 110 starts the timer and unless more data becomes into the message buffer 119 before the timer expires, the user equipment 110 can initiate the SDT procedure with the data in the buffer. Alternatively, this timer/time can be defined in the specification. It should be noted that there may be separate timers 122 for different SDT procedures. In one example, the timer 122 can be set by the network accounting for the data delay target (e.g. Packet Delay Budget, PDB).

In accordance with an embodiment of the disclosure, the user equipment 110 may operate as follows when uplink (UL) data belonging to a SDT DRB or a SDT SRB becomes available for transmission, but the data volume is either less than the minimum data volume threshold 126 or greater than the maximum data volume threshold 129 i.e. is not in the configured range, the user equipment 110 may initiate a regular RRC Resume procedure instead of SDT procedure. This might motivate UE implementations to arrange data transmissions so that SDT could be used according to the network configured data volume range.

The network element 170 may not configure the maximum data volume threshold for the user equipment 110 but only the minimum data volume threshold for SDT and/or for SDT data radio bearer(s) and/or for signalling radio bearer(s) (SRB(s). In such a case the network element 170 can then abort the SDT procedure based on its own logic. For example, the network element 170 can e.g. bring the UE to RRC connected state or release the UE to RRC IDLE/INACTIVE. This can be used, for example, for enabling subsequent SDT transmissions within the same SDT procedure.

According to some embodiments of the disclosure, the network may further configure a counter which counts the amount of SDT transmissions by a user equipment. Such an SDT counter may then be used by the user equipment in the determination whether further SDT transmissions are allowed or prohibited, if the other conditions are met.

In accordance with an embodiment, the SDT counter is incremented each time the user equipment transmits data by the SDT procedure. When a succeeding SDT transmission is to be prepared by the user equipment, the condition evaluator 121 examines the value of the SDT counter and compares the value with a certain maximum value (a configured threshold value). If the value of the SDT counter has not exceeded the maximum value, the user equipment may perform the SDT transmission. On the other hand, if the comparison reveals that the maximum value has been reached, the SDT transmission is not performed but the user equipment may postpone the transmission or may utilize the connected state transmission.

The SDT counter may be reset to an initial value (e.g. zero) when certain conditions are fulfilled. For example, the user equipment may change its state to connected for message transmission before it can again utilize the SDT procedure in the inactive state, wherein the SDT counter may be set to the initial value.

In accordance with an embodiment, the SDT counter is used together with the SDT prohibit timer. For example, the user equipment is allowed to initiate SDT procedures as many times as the value of the SDT counter indicates during certain amount of time, e.g., during the time indicated by the prohibit timer time. In one example, the user equipment starts the SDT prohibit timer upon first SDT attempt and is not allowed to initiate (further) SDT transmissions if the amount of SDT procedures (=the value of the SDT counter) is not less than the configured threshold value and the SDT timer is running. In one alternative example, the user equipment starts the SDT prohibit timer when the SDT counter becomes the same than the configured threshold value. In other words, the SDT timer may be started when a first SDT transmission attempt is performed or when the number of SDT transmissions have reached the configured threshold value.

In accordance with one example, the prohibit timer is configured via broadcast and/or dedicated signalling e.g. system information message or RRC Release message.

In accordance with one example, the prohibit timer is counting microseconds, milliseconds, or seconds, slots, subframes, or symbols, number of SDT occasions (e.g., CG-SDT occasions, or RA-SDT occasions), etc.

In accordance with an embodiment, the user equipment 110 may also have a priority checker 115 which may examine possible priority indications of messages in a situation in which there are more than one message to be transmitted utilizing the small data transmission mechanism. The priority checker 115 may then arrange the messages for transmission in the order indicated by the priorities, wherein the messages are provided to the transmitter 133 in that order.

In accordance with an embodiment, the user equipment 110 may have a message segmenter 117 which may divide a message which is longer than the maximum length to segments having length smaller than or equal to the maximum length. In such a situation the segments of the message may be provided to the transmitter 133 one after the other so that the transmitter 133 transmits each segment using the small data transmission mechanism.

In accordance with an embodiment, the user equipment 110 may have a message combiner 118 which may combine two or more messages, which are shorter than the maximum length into one message so that the length of the combined message is shorter than or equal to the maximum length. Hence, the combined message may be transmitted using the small data transmission mechanism as was already described earlier in the specification.

In accordance with an embodiment, the small data transmission mechanism is allowed for each cause of messages provided that the length of the message is shorter than or equal to the maximum data volume threshold 129 and longer than or equal to the minimum data volume threshold 126.

Figure 4:
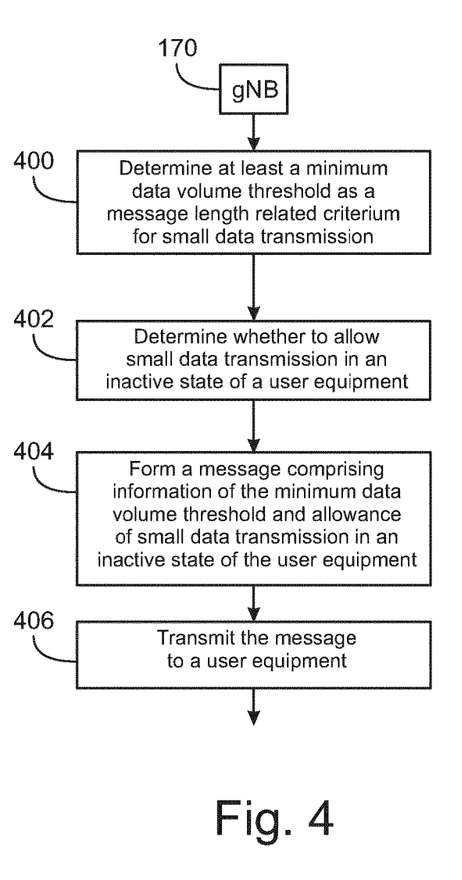
FIG. 4 illustrates as a flow diagram operations which may be performed by a network element to inform parameters related to data volume thresholds for small data transmission mechanism, in accordance with an embodiment.

FIG. 4 illustrates as a flow diagram actions which may be performed by a network element, e.g. the RAT 170, to inform parameters related to the SDT conditions, such as the minimum data volume threshold and the maximum data volume threshold, SDT prohibit timers, the SDT counter, possible other threshold(s) etc. in addition to other small data transmission mechanism related information, in accordance with an embodiment. The network element determines (block 400) at least the minimum data volume threshold as a message length related criterium for small data transmission and may also determine (block 402) whether to allow small data transmission in an inactive state of a user equipment. The network element may form a broadcast message (block 404) and include the above mentioned information to the message. The message may then be transmitted (block 406).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 6:
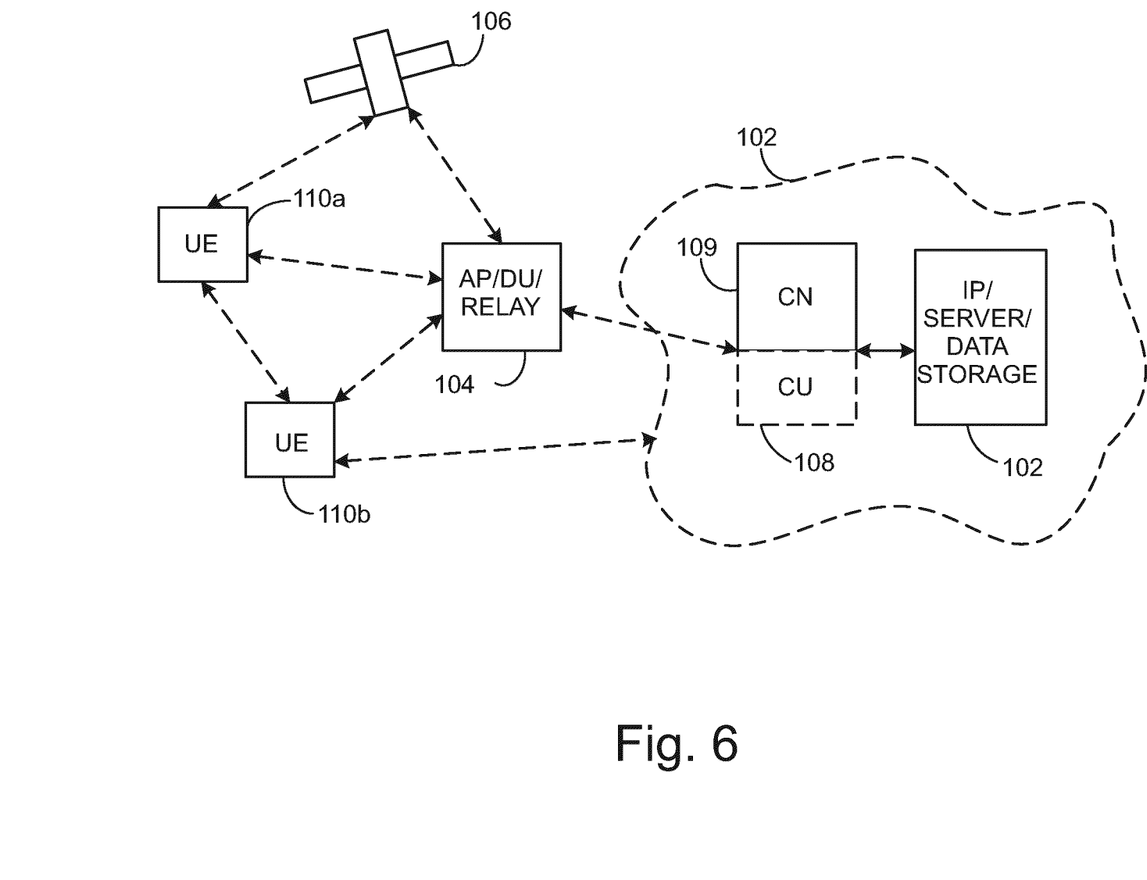
FIG. 6 shows a part of an exemplifying wireless communications access network in accordance with at least some embodiments.

FIG. 6 depicts examples of simplified system architectures only showing some elements and functional entities, all being logical units, whose implementation may differ from what is shown. The connections shown in FIG. 6 are logical connections; the actual physical connections may be different. It is apparent to a person skilled in the art that the system typically comprises also other functions and structures than those shown in FIG. 6.

The embodiments are not, however, restricted to the system given as an example but a person skilled in the art may apply the solution to other communication systems provided with necessary properties.

The example of FIG. 6 shows a part of an exemplifying radio access network.

FIG. 6 shows user equipments 110a and 110b configured to be in a wireless connection on one or more communication channels in a cell with an access node (such as (e/g) NodeB) 104 providing the cell. The physical link from a user equipment to a (e/g)NodeB is called uplink or reverse link and the physical link from the (e/g)NodeB to the user equipment is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user equipments. The antenna unit may comprise a plurality of antennas or antenna elements. The (e/g)NodeB is further connected to core network 109 (CN or next generation core NGC). Depending on the system, the counterpart on the CN side can be a serving gateway (S-GW, routing and forwarding user data packets), packet data network gateway (P-GW), for providing connectivity of user equipments (UEs) to external packet data networks, or mobile management entity (MME), etc. The CN may comprise network entities or nodes that may be referred to management entities. Examples of the network entities comprise at least an Access management Function (AMF).

The user equipment (also called a user device, a user terminal, a terminal device, a wireless device, a mobile station (MS) etc.) illustrates one type of an apparatus to which resources on the air interface are allocated and assigned, and thus any feature described herein with a user equipment may be implemented with a corresponding network apparatus, such as a relay node, an eNB, and an gNB. An example of such a relay node is a layer 3 relay (self-backhauling relay) towards the base station.

The user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user equipment may also be a nearly exclusive uplink only device, of which an example is a camera or video camera loading images or video clips to a network. A user equipment may also be a device having capability to operate in Internet of Things (IoT) network which is a scenario in which objects are provided with the ability to transfer data over a network without requiring human-to-human or human-to-computer interaction. The user equipment may also utilize cloud. In some applications, a user equipment may comprise a small portable device with radio parts (such as a watch, earphones or eyeglasses) and the computation is carried out in the cloud. The user equipment (or in some embodiments a layer 3 relay node) is configured to perform one or more of user equipment functionalities. The user equipment may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 6) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 102, or utilize services provided by them. The communication network may also be able to support the usage of cloud services, for example at least part of core network operations may be carried out as a cloud service (this is depicted in FIG. 6 by "cloud" 102). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 6 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 6). A HNB Gateway (HNB-GW), which is typically installed within an operator's network may aggregate traffic from a large number of HNBs back to a core network.

According to an embodiment, the processor is configured to control the transceiver and/or to perform one or more functionalities described with a method according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
   (i) a combination of analogue and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A user equipment comprising:
   circuitry configured to cause the user equipment to perform at least the following:
   obtaining at least one message length related criterium comprising a minimum data volume threshold equal to 328 bits and a maximum data volume threshold equal to 1000 bits, the thresholds being provided in a radio resource control (RRC) Release message with suspend indication that includes an SDT-Config DataVolumeRange for signaling radio bearer 2 (SRB2);
   preparing a message to a message buffer of the user equipment to be transmitted by a small data transmission (SDT) procedure in an inactive state of the user equipment (RRC_INACTIVE) and only after confirming that a configured grant (CG) resource is configured and valid and that timing advance (TA) information is valid;
   comparing a length of data in the message buffer with the at least one message length related criterium using a length comparator;
   based on the comparison, constructing a packet from the data in the message buffer for transmission as a medium access control (MAC) protocol data unit (PDU) having a transport block size configured for SDT;
   based on a length being less than 328 bits, waiting and accumulating additional data until the length reaches at least 328 bits or until expiration of a network-configured SDT timer set accounting for a packet delay budget (PDB); and
   transmitting the packet by the small data transmission procedure by a configured grant small data transmission (CG-SDT) in a single uplink occurrence, wherein the transmitting comprises:
      selecting a first configuration when the length is greater than 328 bits and less than 1000 bits and selecting a second configuration when the length is 1000 bits;
      incrementing an SDT counter upon transmission;
      refraining from further SDT transmissions while a network-configured SDT prohibit timer is running; and
      receiving an RRC Release with suspend indication that maintains the user equipment in RRC_INACTIVE after the transmission; or
      initiating a regular RRC Resume instead of SDT when the length greater than 1000 bits.

2. The user equipment of claim 1, wherein a length equal to 328 bits is treated as satisfying the first configuration selection condition, such that the first configuration is selected when the length is 328 bits.

3. The user equipment of claim 2, wherein the first configuration corresponds to a configured-grant resource having a smaller transport block size and a shorter configured-grant resource periodicity than the second configuration.

4. The user equipment of claim 3, wherein the user equipment starts an SDT prohibit timer upon receipt of the radio resource control Release message with suspend indication that terminates the small data transmission procedure, and the SDT prohibit timer counts in subframes.

5. The user equipment of claim 4, wherein the user equipment stops the SDT prohibit timer upon either (i) a cell reselection event or (ii) successful establishment or resumption of an RRC connection.

6. The user equipment of claim 3, wherein the user equipment starts an SDT prohibit timer upon a first small data transmission attempt and refrains from additional small data transmission attempts when an SDT counter reaches a configured threshold of two during the running of the SDT prohibit timer.

7. The user equipment of claim 6, wherein, when multiple messages each have a length less than 328 bits and are present in the message buffer, the user equipment combines the messages into a single message whose length is between 328 bits and 1000 bits prior to expiration of the SDT timer, and constructs the medium access control protocol data unit from the combined message.

8. A system comprising:
a user equipment;
circuitry configured to cause the user equipment to perform at least the following:
obtaining at least one message length related criterium comprising a minimum data volume threshold equal to 328 bits and a maximum data volume threshold equal to 1000 bits, the thresholds being provided in a radio resource control (RRC) Release message with suspend indication that includes an SDT-Config DataVolumeRange for signaling radio bearer 2 (SRB2);
preparing a message to a message buffer of the user equipment to be transmitted by a small data transmission (SDT) procedure in an inactive state of the user equipment (RRC_INACTIVE) and only after confirming that a configured grant (CG) resource is configured and valid and that timing advance (TA) information is valid;
comparing a length of data in the message buffer with the at least one message length related criterium using a length comparator;
based on the comparison, constructing a packet from the data in the message buffer for transmission as a medium access control (MAC) protocol data unit (PDU) having a transport block size configured for SDT;
based on a length being less than 328 bits, waiting and accumulating additional data until the length reaches at least 328 bits or until expiration of a network-configured SDT timer set accounting for a packet delay budget (PDB); and
transmitting the packet by the small data transmission procedure by a configured grant small data transmission (CG-SDT) in a single uplink occurrence, wherein the transmitting comprises:
selecting a first configuration when the length is greater than 328 bits and less than 1000 bits and selecting a second configuration when the length is 1000 bits;
incrementing an SDT counter upon transmission;
refraining from further SDT transmissions while a network-configured SDT prohibit timer is running; and
receiving an RRC Release with suspend indication that maintains the user equipment in RRC_INACTIVE after the transmission; or
initiating a regular RRC Resume instead of SDT when the length greater than 1000 bits.

9. The user equipment of claim 8, wherein a length equal to 328 bits is treated as satisfying the first configuration selection condition, such that the first configuration is selected when the length is 328 bits.

10. The user equipment of claim 9, wherein the first configuration corresponds to a configured-grant resource having a smaller transport block size and a shorter configured-grant resource periodicity than the second configuration.

11. The user equipment of claim 10, wherein the user equipment starts an SDT prohibit timer upon receipt of the radio resource control Release message with suspend indication that terminates the small data transmission procedure, and the SDT prohibit timer counts in subframes.

12. The user equipment of claim 11, wherein the user equipment stops the SDT prohibit timer upon either (i) a cell reselection event or (ii) successful establishment or resumption of an RRC connection.

13. The user equipment of claim 12, wherein the user equipment starts an SDT prohibit timer upon a first small data transmission attempt and refrains from additional small data transmission attempts when an SDT counter reaches a configured threshold of two during the running of the SDT prohibit timer.

14. The user equipment of claim 12, wherein, when multiple messages each have a length less than 328 bits and are present in the message buffer, the user equipment combines the messages into a single message whose length is between 328 bits and 1000 bits prior to expiration of the SDT timer, and constructs the medium access control protocol data unit from the combined message.

15. A method performed by a user equipment, the method comprising:
obtaining at least one message length related criterium comprising a minimum data volume threshold equal to 328 bits and a maximum data volume threshold equal to 1000 bits, the thresholds being provided in a radio resource control (RRC) Release message with suspend indication that includes an SDT-Config DataVolumeRange for signaling radio bearer 2 (SRB2);
preparing a message to a message buffer of the user equipment to be transmitted by a small data transmission (SDT) procedure in an inactive state of the user equipment (RRC_INACTIVE) and only after confirming that a configured grant (CG) resource is configured and valid and that timing advance (TA) information is valid;
comparing a length of data in the message buffer with the at least one message length related criterium using a length comparator;
based on the comparison, constructing a packet from the data in the message buffer for transmission as a medium access control (MAC) protocol data unit (PDU) having a transport block size configured for SDT;
based on a length being less than 328 bits, waiting and accumulating additional data until the length reaches at least 328 bits or until expiration of a network-configured SDT timer set accounting for a packet delay budget (PDB); and transmitting the packet by the small data transmission procedure by a configured grant small data transmission (CG-SDT) in a single uplink occurrence, wherein the transmitting comprises:
  selecting a first configuration when the length is greater than 328 bits and less than 1000 bits and selecting a second configuration when the length is 1000 bits;
  incrementing an SDT counter upon transmission;
    refraining from further SDT transmissions while a network-configured SDT prohibit timer is running; and
    receiving an RRC Release with suspend indication that maintains the user equipment in RRC_INACTIVE after the transmission; or
  initiating a regular RRC Resume instead of SDT when the length greater than 1000 bits.

16. The method of claim 15, wherein a length equal to 328 bits is treated as satisfying the first configuration selection condition, such that the first configuration is selected when the length is 328 bits.

17. The method of claim 16, wherein the first configuration corresponds to a configured-grant resource having a smaller transport block size and a shorter configured-grant resource periodicity than the second configuration.

18. The method of claim 17, further comprising starting an SDT prohibit timer upon receipt of the radio resource control Release message with suspend indication that terminates the small data transmission procedure, and the SDT prohibit timer counts in subframes.

19. The method of claim 18, further comprising starting the SDT prohibit timer upon either (i) a cell reselection event or (ii) successful establishment or resumption of an RRC connection.

20. The method of claim 18, further comprising starting an SDT prohibit timer upon a first small data transmission attempt and refrains from additional small data transmission attempts when an SDT counter reaches a configured threshold of two during the running of the SDT prohibit timer, and wherein, when multiple messages each have a length less than 328 bits and are present in the message buffer, the user equipment combines the messages into a single message whose length is between 328 bits and 1000 bits prior to expiration of the SDT timer, and constructs the medium access control protocol data unit from the combined message.

* * * * *